(12) United States Patent
Fujiwara et al.

(10) Patent No.: US 12,455,981 B2
(45) Date of Patent: Oct. 28, 2025

(54) PERSONAL INFORMATION PROTECTION MANAGEMENT SYSTEM FOR GENOMIC DATA

(71) Applicant: National Institute of Information and Communications Technology, Tokyo (JP)

(72) Inventors: Mikio Fujiwara, Tokyo (JP); Masahiro Takeoka, Tokyo (JP); Masahide Sasaki, Tokyo (JP); Masao Nagasaki, Kyoto (JP)

(73) Assignee: National Institute of Information and Communications Technology, Tokyo (JP)

( * ) Notice: Subject to any disclaimer, the term of this patent is extended or adjusted under 35 U.S.C. 154(b) by 160 days.

(21) Appl. No.: 18/577,940

(22) PCT Filed: Jun. 30, 2022

(86) PCT No.: PCT/JP2022/026412
§ 371 (c)(1),
(2) Date: Jan. 9, 2024

(87) PCT Pub. No.: WO2023/002836
PCT Pub. Date: Jan. 26, 2023

(65) Prior Publication Data
US 2024/0320369 A1 Sep. 26, 2024

(30) Foreign Application Priority Data
Jul. 19, 2021 (JP) .................. 2021-118556

(51) Int. Cl.
*H04L 29/06* (2006.01)
*G06F 21/60* (2013.01)
*G06F 21/62* (2013.01)

(52) U.S. Cl.
CPC ........ *G06F 21/6245* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 10,574,446 B2* | 2/2020 | Fu | H04L 9/0852 |
| 2003/0208378 A1* | 11/2003 | Thangaraj | G16H 30/40 |
| | | | 705/2 |

(Continued)

FOREIGN PATENT DOCUMENTS

| | | |
|---|---|---|
| JP | 2008011360 A | 1/2008 |
| JP | 2018503167 A | 2/2018 |
| WO | 2020075273 A1 | 4/2020 |

OTHER PUBLICATIONS

Fujiwara et al., "3. Quantum Optical Network Technology, 3-1. Current Status of Quantum Key Distribution Network Research and Development", Journal of the National Institute of Information and Communications Technology, Japan, National Research and Development Agency National Institute of Information and Communications Technology, Oct. 31, 2017, vol. 63, No. 1, 2017, pp. 9 to 18.

(Continued)

*Primary Examiner* — Shin-Hon (Eric) Chen
(74) *Attorney, Agent, or Firm* — GRUMBLES LAW PLLC; Brittany Haanan (57) ABSTRACT

A personal information protection management system for genomic data includes data storage, role storage, a filter, and a data output part. The data storage is configured to store genomic data. The role storage is configured to store an identifier of a data output destination and a role in association with each other, the role including a detail of filtering for removing from genomic data a part that is not to be outputted. The filter is configured to filter the stored genomic (Continued)

data based on the stored role. The data output part is configured to output the filtered genomic data to the data output destination. The filter is configured to obtain a data request signal transmitted from the data output destination and, based on the role that is associated with the identifier included in the obtained data request signal, filter the genomic data.

3 Claims, 4 Drawing Sheets

(56) References Cited

U.S. PATENT DOCUMENTS

| | | | |
|---|---|---|---|
| 2015/0100781 A1* | 4/2015 | Yann | H04L 9/085 |
| | | | 713/165 |
| 2017/0262579 A1 | 9/2017 | Agrawal et al. | |
| 2018/0373834 A1* | 12/2018 | Cho | G16B 50/30 |
| 2020/0234794 A1 | 7/2020 | Esteves-Veríssimo et al. | |
| 2021/0083864 A1* | 3/2021 | Bush | H04L 9/088 |
| 2021/0183468 A1 | 6/2021 | Hahm et al. | |
| 2021/0210215 A1 | 7/2021 | Davis-Turak et al. | |
| 2021/0351916 A1 | 11/2021 | Tsuchida et al. | |
| 2021/0409400 A1* | 12/2021 | Palanisamy | H04L 67/12 |
| 2022/0209934 A1* | 6/2022 | Karimi | H04L 9/008 |
| 2023/0048167 A1* | 2/2023 | Gai | G06F 21/16 |
| 2023/0094541 A1* | 3/2023 | Gai | G06F 16/13 |
| | | | 713/189 |
| 2024/0154884 A1* | 5/2024 | Jain | H04L 43/02 |
| 2024/0291640 A1* | 8/2024 | Amer | H04L 9/0819 |

OTHER PUBLICATIONS

Office Action for Japanese Patent Application No. 2021-118556, dated Nov. 27, 2024.
Task Force for Promoting the Practical Use of Genomic Information in Medical Treatments, "Regarding the Handling of Genomic Data Under the Revised Personal Information Protection Act (TF summary), Summary Version", Japan, Ministry of Health, Labour and Welfare, Jan. 22, 2016, the Internet, (URL address https://www.mhlw.go.jp/file/05-Shingikai-10601000-Daijinkanboukouseikagakuka-Kouseikagakuka/160208_task_gaiyo.pdf).
International Search Report and Written Opinion pertaining to PCT/JP2022/026412, mailed Oct. 4, 2022.
Japanese online page of Illumina, Inc., for a product called "Dragen Germline" at [https://jp.illumina.com/products/by-type/informatics-products/basespace-sequence-hub/apps/dragen-germline.html](D1, Non-Patent Literature 1 cited in Specification).
Masahiro Takeoka, "Tokyo QKD Network: Construction and utilization of quantum cryptography network testbed", Mar. 8, 2021, NICT's Integrated Testbed Symposium 2021, avaliable online at [https://testbed.nict.go.jp/event/pdf/sympo_05-3.pdf].
Extended European Search Report pertaining to European Patent Application No. 22845770.1, issued Jun. 27, 2025.
Fujiwara et al., "Secure Secondary Utilization System of Genomic Data Using Quantum Secure Cloud", arxiv.org, Cornell University Library, 2002.
Tajima et al., "Quantum Key Distribution Network for Multiple Applications", Quantum Science and Technology, 2017, 2, 034003.

* cited by examiner

PERSONAL INFORMATION PROTECTION MANAGEMENT SYSTEM FOR GENOMIC DATA

CROSS-REFERENCE STATEMENT

This application is US National Stage of International Patent Application PCT/JP2022/026412, filed Jun. 30, 2022, which claims benefit of priority from Japanese Patent Application JP2021-118556, filed Jul. 19, 2021, the contents of both of which are incorporated herein by reference.

BACKGROUND

Technical Field

The present invention relates to a technology for utilizing genomic data while protecting personal information.

Related Art

In genome analysis, high-speed implementations that use dedicated hardware is currently in wide use. In such hardware, genomic data is stored in a FASTQ format that includes quality scores and sequence information. The genomic data is then, for example, converted into a Variant Call Format (VCF), which includes a variant found in the sequence information and location information of the variant, so that the genomic data may be sent to an analyzer or the like in the VCF format via an internet connection or the like.

Non-patent Literature 1 discloses a technology for converting FASTQ formatted data into VCF formatted data (https://jp.illumina.com/products/by-type/informatics-products/basespace-sequence-hub/apps/dragen-germline.html [search date: Jun. 22, 2021]).

The genomic data that is converted into the VCF format includes variant information or the like that is not a target for analysis. Of the genomic data, data that is not a target for analysis is personal information that should be maintained as confidential information. Prevention of leakage of such information is therefore desirable.

SUMMARY

An aspect of the present invention provides a personal information protection management system for genomic data that includes the following: data storage configured to store genomic data; role storage configured to store an identifier of a data output destination and a role in association with each other, the role including a detail of filtering for removing from the genomic data a part that is not to be outputted; a filter configured to filter the stored genomic data based on the stored role; and a data output part configured to output the filtered genomic data to the data output destination. The filter is configured to obtain a data request signal transmitted from the data output destination and, based on the role that is associated with the identifier included in the obtained data request signal, filter the genomic data.

DESCRIPTION OF EMBODIMENTS

An embodiment of the present invention will be described in detail with reference to the drawings. In the description that follows, the same elements are denoted by the same reference signs and redundant description will be omitted.

Figure 1:
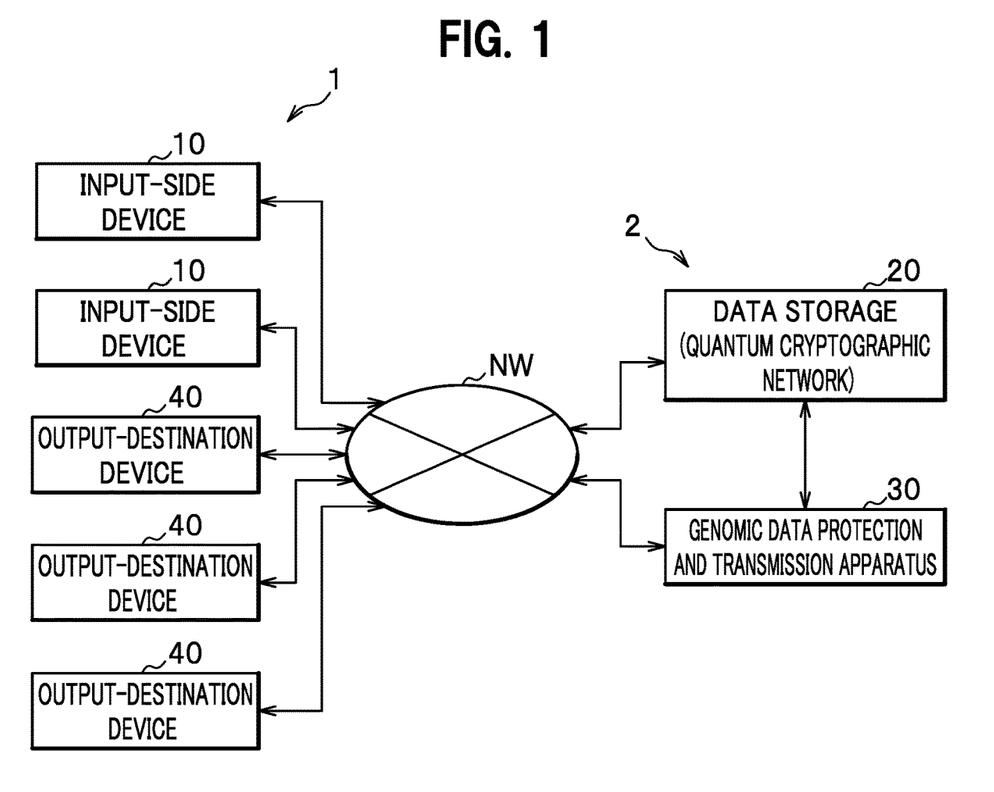
FIG. 1 is a block diagram schematically showing a genomic data utilization system according to an embodiment of the present invention.

As shown in FIG. 1, a genomic data utilization system 1 according to an embodiment of the present invention includes one or more input-side devices 10, a plurality of output-destination devices 40, and a personal information protection management system for genomic data 2 that is communicatively connected to these devices via a network NW.

Input-Side Device

Figure 2:
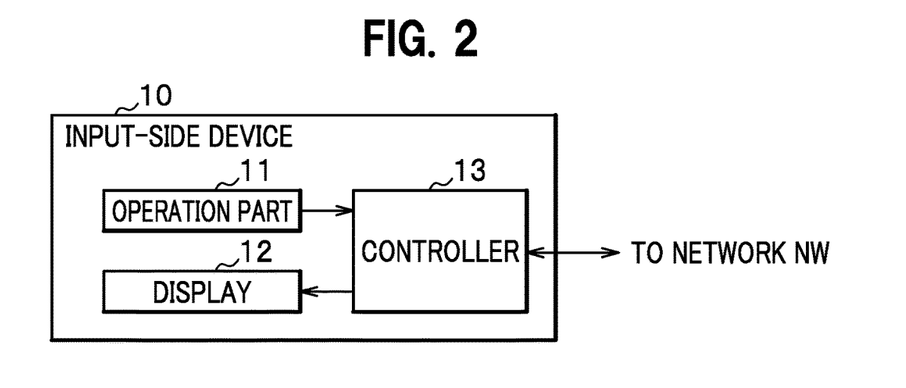
FIG. 2 is a block diagram schematically showing an input-side device of FIG. 1.

The input-side device 10 is, for example, provided in a hospital or the like. The input-side device 10 is configured to transmit genomic data that has been generated by analyzing a specimen containing a gene to the personal information protection management system for genomic data 2. As shown in FIG. 2, the input-side device 10 includes an operation part 11, a display 12, and a controller 13.

The operation part 11 is configured to include a keyboard, a mouse, a touch panel, or the like. The operation part 11 outputs a result of an operation by a user to the controller 13. The display 12 is configured to include a display or the like and displays an image or the like based on control by the controller 13.

The controller 13 is configured to include a central processing unit (CPU), a read-only memory (ROM), a random access memory (RAM), and an input/output circuit or the like. The controller 13 controls the operation part 11 and the display 12 and transmits data to the personal information protection management system for genomic data 2 via the network NW.

In the present embodiment, the controller 13 generates genomic data based on a result of an operation on the operation part 11 or obtains genomic data that is generated by another analyzer. The genomic data includes a personal identifier of an individual and sequence information of bases. The controller 13 converts the genomic data into a FASTQ format, performs quantum encryption (for example, Vernam encryption) of the genomic data that has been converted into the FASTQ format, and generates a quantum key for decrypting the quantum-encrypted genomic data. The genomic data converted into the FASTQ format includes a personal identifier of an individual, sequence information of bases, and a quality score indicating a reliability of a base in the sequence information. The controller 13 transmits the quantum-encrypted genomic data in the FASTQ format and the generated quantum key to the personal information protection management system for genomic data 2 via the network NW. Here, the controller 13 performs authentication with the personal information protection management system for genomic data 2 by using Wegman-Carter authentication in order to ensure information-theoretic security.

Personal Information Protection Management System for Genomic Data

As shown in FIG. 1, the personal information protection management system for genomic data 2 includes data storage 20, role storage 31, a filter 35, and a data output part 36. The data storage 20 is configured to store genomic data. The role storage 31 is configured to store a role and an identifier of a data output destination in association with each other. A role includes a detail of filtering for removing a part of genomic data that may not be outputted. The filter 35 is configured to filter the stored genomic data based on the stored role. The data output part 36 is configured to output the filtered genomic data to a data output destination. The filter 35 obtains a data request signal transmitted from the data output destination and filters genomic data based on a role that is associated with an identifier that is included in the obtained data request signal.

That is, the personal information protection management system for genomic data 2 stores and manages the quantum-encrypted genomic data and quantum key that are transmitted from the input-side device 10. The personal information protection management system for genomic data 2 decrypts the managed genomic data using the quantum key and transmits the decrypted genomic data in a personal-information protected state to an output-destination device 40. The data storage 20 and a genomic data protection and transmission apparatus 30 that the personal information protection management system for genomic data 2 includes will be described below. In the present embodiment, it is described that the role storage 31, filter 35, and data output part 36 are provided in the genomic data protection and transmission apparatus 30.

The data storage 20 is configured to include a plurality of server computers 21 that are connected to each other by a quantum cryptographic network. Genomic data is distributed among the plurality of server computers 21 as a secret by a secret sharing scheme and stored as shares in the plurality of server computers 21. The personal information protection management system for genomic data 2 includes a data decryption part 33 that is configured to reconstruct the genomic data by combining the shares and decrypt the reconstructed genomic data. The filter 35 filters the decrypted genomic data based on the stored role. In the present embodiment, the data decryption part 33 is described as being provided in the genomic data protection and transmission apparatus 30.

Data Storage

Figure 3:
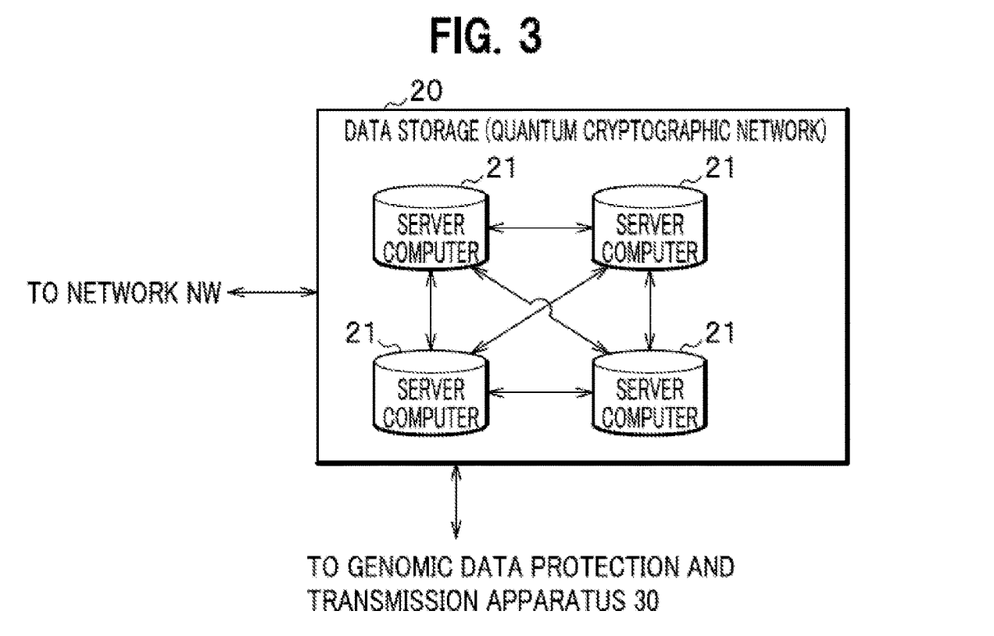
FIG. 3 is a block diagram schematically showing data storage of FIG. 1.

As illustrated in FIG. 3, the data storage 20 includes a plurality of server computers 21 that are communicatively connected to each other via a quantum cryptographic network. The quantum cryptographic network provides a connection by a line that allows information-theoretically secure communication for the plurality of server computers 21. The data storage 20 receives the quantum-encrypted genomic data that is transmitted by the controller 13 of the input-side device 10, distributes the received, encrypted genomic data among the plurality of server computers 21 as a secret by a secret sharing scheme so that shares of the secret are stored in the plurality of server computers 21. A share of the distributed genomic data includes a personal identifier of an individual, a part of the sequence information of bases, and a part of the quality scores in a quantum-encrypted state.

That is, genomic data of an individual is distributed among and stored in the plurality of server computers 21 in a quantum-encrypted state. In other words, a part of the genomic data of an individual is stored in one server computer 21 in a quantum-encrypted state.

The quantum-encrypted and secret-shared genomic data is resistant to a cyberattack because data cannot be restored unless decryption is carried out after the secret is reconstructed from the shares.

In the present embodiment, the data storage 20 performs exclusive OR (XOR)—based secret sharing. For example, for a secret sharing scheme with a (2, 3) threshold, for secret data $Q=Q1 \cdot Q2$, the data storage 20 prepares a random number $R=R1 \cdot R2$ having the same number of bits as the secret data Q, and calculates shares A, B, and C as follows: $A=A1 \cdot A2=(Q1+R1) \cdot (Q2+R2+R1)$; $B=B1 \cdot B2=(Q1+R1+R2)$; and $C=C1 \cdot C2=R1 \cdot R2$. Here, "·" indicates combination, and the data size of each of the combined data is the same. Further, "+" indicates an exclusive OR (XOR). Shares A, B, and C, which are shares of the secret-shared genomic data, are assigned with an identifier and individually stored in different server computers 21. Such secret sharing may be handled by any of the plurality of server computers 21 of the data storage 20 or by the genomic data protection and transmission apparatus 30 to be described later.

Genomic Data Protection and Transmission Apparatus

Figure 4:
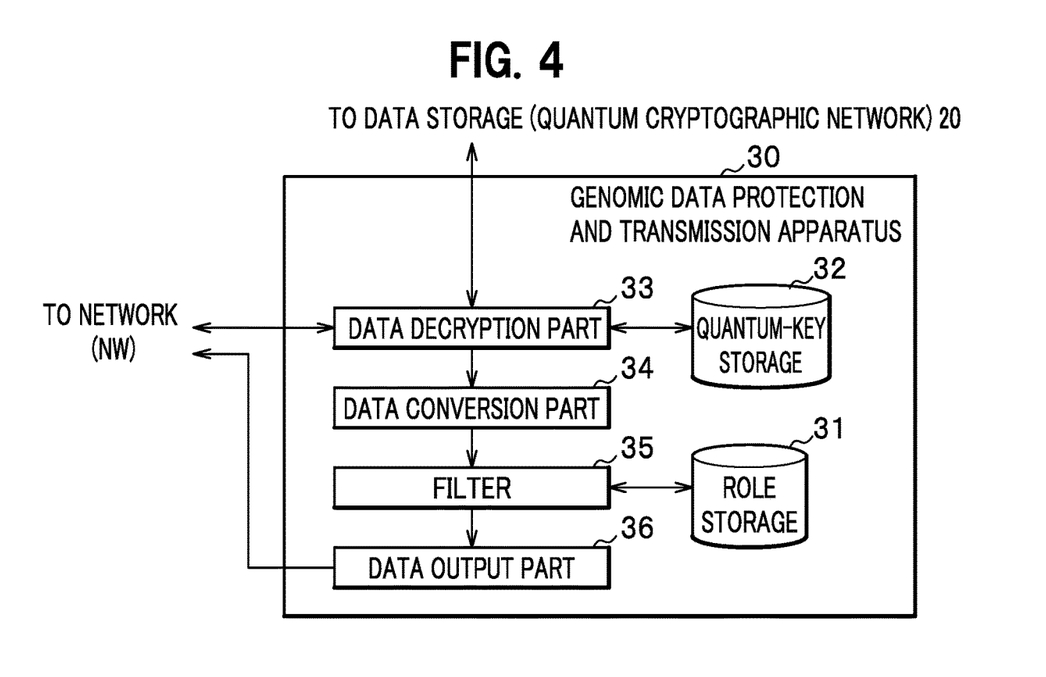
FIG. 4 is a block diagram schematically showing a genomic data protection and transmission apparatus of FIG. 1.

As shown in FIG. 1, the genomic data protection and transmission apparatus 30 is an apparatus (a server computer) that is configured to transmit genomic data stored in the data storage 20 to an output-destination device 40 in a state where personal information is protected. The genomic data protection and transmission apparatus 30 is configured to include a central processing unit (CPU), a read-only memory (ROM), a random access memory (RAM), and an input/output circuit, or the like. As shown in FIG. 4, the genomic data protection and transmission apparatus 30 includes, as functional parts, role storage 31, quantum-key storage 32, a data decryption part 33, a data conversion part 34, a filter 35, and a data output part 36.

Role Storage

The role storage 31 stores in advance an identifier of an output destination (an output-destination device 40) and a role indicating a detail of filtering so that said identifier and said role are stored in association with each other. The role includes information indicating which part of information is to be kept in and which part of information is to be removed from genomic data by filtering. For example, the role includes location information indicating a location of sequence information to be transmitted to an output destination (or a location of sequence information not to be transmitted but to be removed).

Quantum-Key Storage

The quantum-key storage 32 is configured to store the quantum key that is transmitted from the input-side device 10 by the controller 13 thereof.

Data Decryption Part

The data decryption part 33 is configured to read the shares of the secret-shared genomic data from the plurality of server computers 21 and reconstruct the genomic data by combining the read shares. The data decryption part 33 is configured to decrypt the reconstructed genomic data using the quantum key stored in the quantum-key storage 32 and output the decrypted genomic data to the data conversion part 34. More specifically, the data decryption part 33 restores the genomic data by combining data having the same personal identifier based on the personal identifier included in the secret-shared genomic data. Further, the data decryption part 33 reads a quantum key that includes an identifier that is the same as an identifier included in the genomic data (a personal identifier or an identifier assigned at the time of secret sharing) from the quantum-key storage 32 and decrypts the genomic data using the read quantum key.

In the present embodiment, the data decryption part 33 assigns an identifier that is assigned to the secret-shared genomic data to a quantum key having the same personal identifier as the personal identifier of the genomic data. The data decryption part 33 obtains at least two of the shares A, B, and C of secret-shared genomic data that have the same identifier as the identifier that is assigned to the quantum key from the data storage 20. Based on the obtained shares, the data decryption part 33 decrypts the genomic data.

Data Conversion Part

The data conversion part 34 is configured to obtain the decrypted genomic data outputted by the data decryption part 33, convert the obtained genomic data from the FASTQ format to the variant call format (VCF), and output the genomic data converted into the VCF format to the filter 35. The genomic data converted into the VCF format includes a personal identifier, sequence information of a part where a variation occurs, and location information of said variation. Here, the location information of a variation is information indicating where the variation occurs in the entire sequence information. The data conversion part 34 compares reference genomic data in the FASTQ format (normal sequence information and/or sequence information in which a variation has occurred) that is stored in advance with the decrypted genomic data in the FASTQ format in order to determine a variation in the decrypted genomic data in the FASTQ format and generate genomic data in the VCF format on the basis of the determination result. The genomic data in the VCF format includes sequence information of a part where a variation occurs out of an entire sequence information of an individual. The genomic data in the VCF format also includes location information of said variation. A normal part (as in where a variation has not occurred) of the entire sequence information is not included in the genomic data in the VCF format. Therefore, the genomic data in the VCF format is genomic data that includes sequence information of the part where a variation occurs and location information of said variation but excludes sequence information of the part that is normal. The genomic data in the VCF format has a smaller data quantity compared to the genomic data in the FASTQ format.

Filter

The filter 35 is configured to obtain the genomic data in the VCF format outputted by the data conversion part 34, filter the obtained genomic data based on the role stored in the role storage 31, and outputs the filtered genomic data to the data output part 36. More specifically, the filter 35 reads, from the role storage 31, a role associated with an identifier of an output destination that is the same as an identifier of an output destination (output-destination device 40) included in a genomic-data request signal. The filter 35 then filters the genomic data in the VCF format based on the read role.

The filtered genomic data is variation information at a location in the genomic data in the VCF format that is to be transmitted to the output destination, does not include information capable of identifying an individual such as a personal identifier, and is configured to include information (for example, data of individual SNPs at less than 40 locations) necessary for the output-destination device 40.

Data Output Part

The data output part 36 is configured to output (transmit) the filtered genomic data outputted by the filter 35 to the output-destination device 40 via the network NW. In the present embodiment, the data output part 36 performs quantum encryption of the filtered genomic data and transmits the quantum-encrypted, filtered genomic data and a quantum key for decrypting the quantum-encrypted genomic data to the corresponding output-destination device 40 via the network NW.

Since the genomic data protection and transmission apparatus 30 is implemented as a device (server computer) that is separate from the server computer 21 of the data storage 20, calculation resources of the genomic data protection and transmission apparatus 30 can be reduced. Further, since the genomic data protection and transmission apparatus 30 does not have genomic data apart from when performing protected transmission of genomic data, resistance to cyberattacks is improved.

Output-Destination Device

Figure 5:
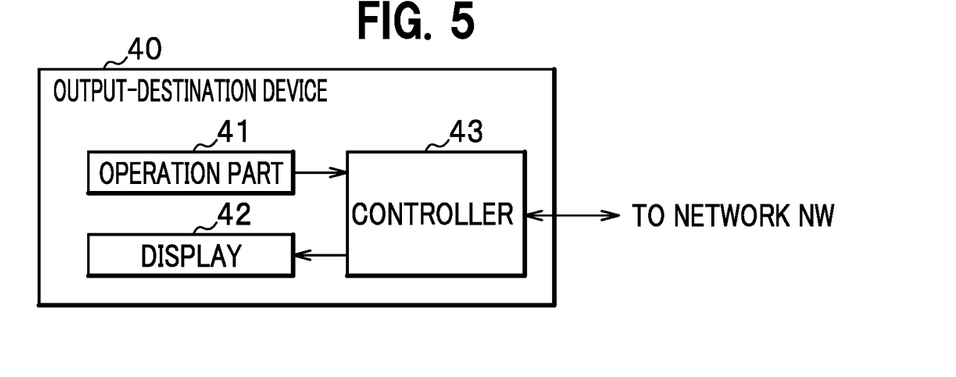
FIG. 5 is a block diagram schematically showing an output-destination device of FIG. 1.

As shown in FIG. 1, the output-destination device 40 that is, for example, provided at a laboratory, a pharmaceutical company, or the like is configured to obtain genomic data in a personal-information protected state. The obtained genomic data is analyzed for the development of a new drug, new treatment method, or the like. As illustrated in FIG. 5, the output-destination device 40 includes an operation part 41, a display 42, and a controller 43.

The operation part 41 is configured to include a keyboard, a mouse, a touch panel, or the like and outputs a result of an operation by a user to the controller 43. The display 42 is configured to include a display or the like and display an image or the like based on a control by the controller 43.

The controller 43 is configured to include a central processing unit (CPU), a read-only memory (ROM), a random access memory (RAM), and an input/output circuit or the like. The controller 43 controls the operation part 41 and the display 42 and receives data from the personal information protection management system for genomic data 2 via the network NW.

In the present embodiment, the controller 43 receives the quantum-encrypted, filtered genomic data (in the VCF format) and the quantum key that are transmitted by the data output part 36 of the genomic data protection and transmission apparatus 30. The controller 43 obtains the filtered genomic data (in the VCF format) by decrypting the quantum-encrypted genomic data using the received quantum key.

Operation Example

Next, an operation example of the genomic data utilization system 1 according to an embodiment of the present invention will be described with reference to a flowchart.

Management of Genomic Data

Figure 6:
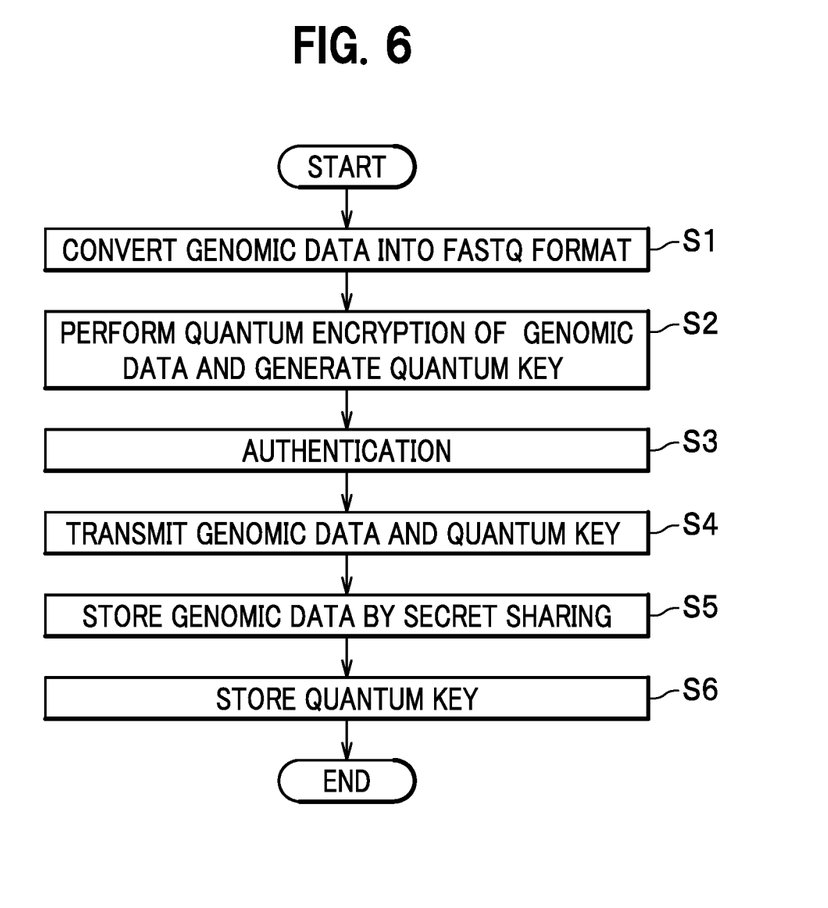
FIG. 6 is a flowchart for explaining an operation example of the genomic data utilization system according to an embodiment of the present invention.

As shown in FIG. 6, the controller 13 of an input-side device 10 converts genomic data into a FASTQ format (step S1). Subsequently, the controller 13 performs quantum encryption of the genomic data that has been converted into the FASTQ format and generates a quantum key (step S2). Subsequently, the controller 13 performs authentication with the personal information protection management system for genomic data 2 by using Wegman-Carter authentication and establishes a communication connection that is information-theoretically secure (step S3). Subsequently, the controller 13 transmits the quantum-encrypted genomic data and the quantum key to the personal information protection management system for genomic data 2 (step S4).

Subsequently, the data storage 20 of the personal data protection management system for genomic data 2 receives the quantum-encrypted genomic data and, using a secret sharing scheme, distributes the received genomic data, a secret, among a plurality of server computers 21 so that the secret-shared genomic data is stored as shares in the plurality of server computers 21 (step S5). Further, the data decryption part 33 of the genomic data protection and transmission apparatus 30 of the personal data protection management system for genomic data 2 receives the quantum key and stores the received quantum key in the quantum-key storage 32 (step S6). The steps S5 and S6 may be executed simultaneously. Alternatively, the step S6 may be executed first.

Protected Transmission of Genomic Data

Figure 7:
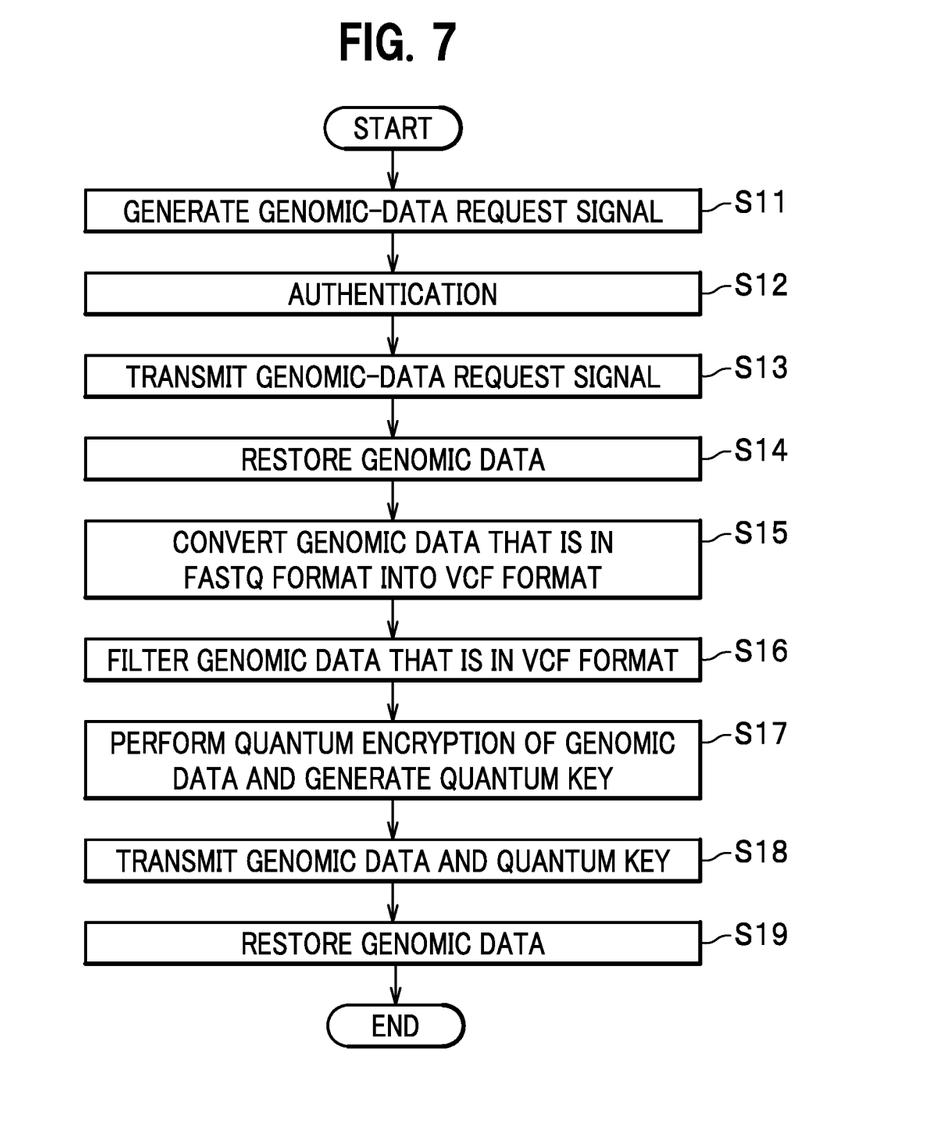
FIG. 7 is a flowchart for explaining an operation example of the genomic data utilization system according to an embodiment of the present invention.

As shown in FIG. 7, the controller 43 of an output-destination device 40 generates a genomic-data request signal based on a result of an operation of the operation part 41 by a user (step S11). Subsequently, the controller 43 performs authentication with the personal information protection management system for genomic data 2 using Wegman-Carter authentication and establishes a communication connection that is information-theoretically secure (step S12). Subsequently, the controller 43 transmits the genomic-data request signal to the personal information protection management system for genomic data 2 (Step S13).

Subsequently, the data decryption part 33 of the genomic data protection and transmission apparatus 30 receives the genomic-data request signal and reads the secret-shared and quantum-encrypted genomic data that is stored in the data storage 20. Subsequently, the data decryption part 33 combines the shares read from the data storage 20 to restore the quantum-encrypted genomic data and, using the quantum key stored in the quantum-key storage 32, decrypts the quantum-encrypted genomic data to restore the genomic data in the FASTQ format (step S14). Subsequently, the data conversion part 34 converts the genomic data in the FAST format into a VCF format (step S15). Subsequently, the filter 35 filters the genomic data in the VCF format by using the role stored in the role storage 31 (step S16). Subsequently, the data output part 36 performs quantum encryption of the filtered genomic data in the VCF format and generates a quantum key (step S17). Subsequently, the data output part 36 transmits the quantum-encrypted, filtered genomic data and the quantum key to the corresponding output-destination device 40 (step S18).

Subsequently, the controller 43 of the output-destination device 40 receives the quantum-encrypted genomic data and the quantum key and, by decrypting the quantum-encrypted genomic data using the quantum key, restores the filtered genomic data in the VCF format (step S19).

According to an embodiment of the present invention, the filter 35 of the personal information protection management system for genomic data 2 that includes the above-described configuration obtains the data request signal transmitted from the data output destination and filters genomic data based on a role associated with an identifier.

By filtering genomic data according to a destination of data transmission, the personal information protection management system for genomic data 2 is capable of transmitting genomic data in a state where personal information is protected, thereby preventing leakage of confidential information.

The personal information protection management system for genomic data 2 includes the data decryption part 33 that reconstructs genomic data by combining shares and decrypts the reconstructed genomic data, which is then filtered by the filter 35 based on the stored role.

By storing genomic data using a secret sharing scheme, the personal information protection management system for genomic data 2 can improve resistance to cyberattacks. In addition, by implementing the data decryption part 33, the filter 35, and the data output part 36 or the like as a separate device from the server computer 21 in which genomic data is stored, the personal information protection management system for genomic data 2 can shorten the time during which the decrypted genomic data exists in the separate device, thereby improving the resistance to cyberattacks.

The personal information protection management system for genomic data 2 includes the data conversion part 34 that converts the decrypted genomic data from the FASTQ format to the VCF format, which includes sequence information of a part where a variation occurs and location information of the variation, and outputs the genomic data converted to the VCF format to the filter 35. Therefore, the personal information protection management system for genomic data 2 can provide a data output destination with genomic data that is in a format that has a small data quantity and is suitable for analysis.

The data output destination and the data output part 36 are communicatively connected to each other using authentication. The data output part 36 performs quantum encryption of the filtered genomic data, generates a quantum key for decrypting the quantum-encrypted genomic data, and transmits the quantum-encrypted genomic data and the quantum key to the authenticated data output destination.

Therefore, the personal information protection management system for genomic data 2 can provide genomic data to a data output destination in a state where information-theoretical security is guaranteed.

Although an embodiment of the present invention has been described above, the present invention is not limited to said embodiment. The embodiment may be appropriately modified without departing from the scope of the present invention. For example, the data storage 20 may store genomic data that has not been converted into the FASTQ format and the data conversion part 34 may convert the genomic data into the FASTQ format and further convert the genomic data in the FASTQ format into the VCF format.

An object of the disclosure is to provide a personal information protection management system for genomic data that is capable of preventing leakage of confidential information.

According to the disclosure, by filtering genomic data according to a destination of data transmission, genomic data can be transmitted in a personal-information protected state, thereby preventing leakage of confidential information.

REFERENCE SIGNS LIST

2 Personal information protection management system for genomic data
20 Data storage
31 Role storage
33 Data decryption part
34 Data conversion part
35 Filter
36 Data output part
40 Output-destination device (data output destination)

What is claimed is:
1. A personal information protection management system for genomic data, comprising:

data storage configured to store genomic data, the data storage including a plurality of server computers that are connected to each other by a quantum cryptographic network;

role storage configured to store an identifier of a data output destination and a role in association with each other, the role including a detail of filtering for removing from the genomic data a part that is not to be outputted; and a hardware processor configured to:
 filter the stored genomic data based on the stored role; and
 output the filtered genomic data to the data output destination, wherein the genomic data is distributed among the plurality of server computers by a secret sharing scheme and stored as shares in the plurality of server computers, the genomic data is stored in the plurality of server computers in a FASTQ format including a quality score and sequence information, and the hardware processor is configured to:
 obtain a data request signal transmitted from the data output destination and, based on the role that is associated with the identifier included in the obtained data request signal, filter the genomic data;
 reconstruct the genomic data from the shares and decrypt the reconstructed genomic data;
 convert the decrypted genomic data into a VCF format that includes sequence information of a part where a variation occurs and location information of the variation;
 filter the genomic data converted into the VCF format based on the stored role;
 perform quantum encryption of the filtered genomic data and generate a quantum key for decrypting the quantum-encrypted genomic data; and
 transmit the quantum-encrypted genomic data and the quantum key to the data output destination.

2. The personal information protection management system for genomic data according to claim 1,
 wherein
 the hardware processor is configured to filter the decrypted genomic data based on the stored role.

3. The personal information protection management system for genomic data according to claim 1, wherein
 the data output destination and the hardware processor are configured to communicatively connect to each other using authentication, and
 the hardware processor is configured to:
  transmit the quantum-encrypted genomic data and the quantum key to the authenticated data output destination.

* * * * *